C. E. KIMBALL.
Apple-Corer and Slicer.

No. 166,013. Patented July 27, 1875.

WITNESSES:
A Bennerendorf
N. F. Terry

INVENTOR:
C. E. Kimball
BY
ATTORNEYS.

UNITED STATES PATENT OFFICE.

CHARLES E. KIMBALL, OF NEW YORK, N. Y.

IMPROVEMENT IN APPLE CORERS AND SLICERS.

Specification forming part of Letters Patent No. 166,013, dated July 27, 1875; application filed December 19, 1874.

*To all whom it may concern:*

Be it known that I, CHARLES E. KIMBALL, of the city, county, and State of New York, have invented a new and Improved Apple Corer and Slicer, of which the following is a specification:

My invention consists of quartering-blades radiating from a common center, in which is a revolving shaft carrying a couple of bow-shaped knives, which, being turned after the quartering-blades have been pressed into the apple, will cut out the core, after which the quartering-blades, being driven down through the apple, will finally separate the cored quarters.

Figure 1:
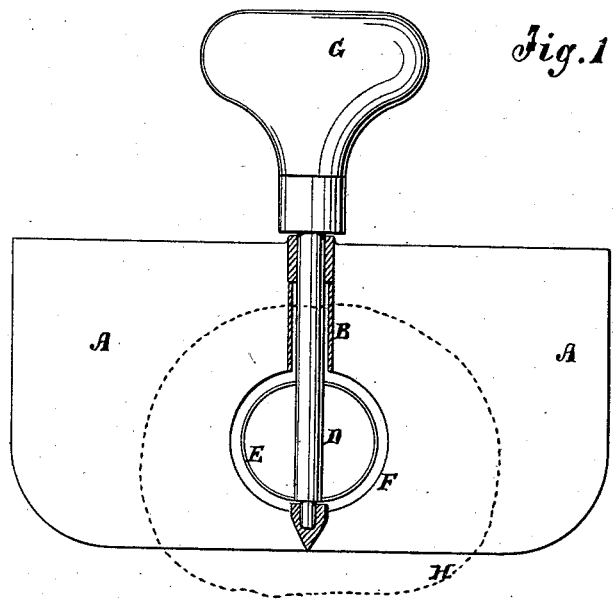
Figure 2:
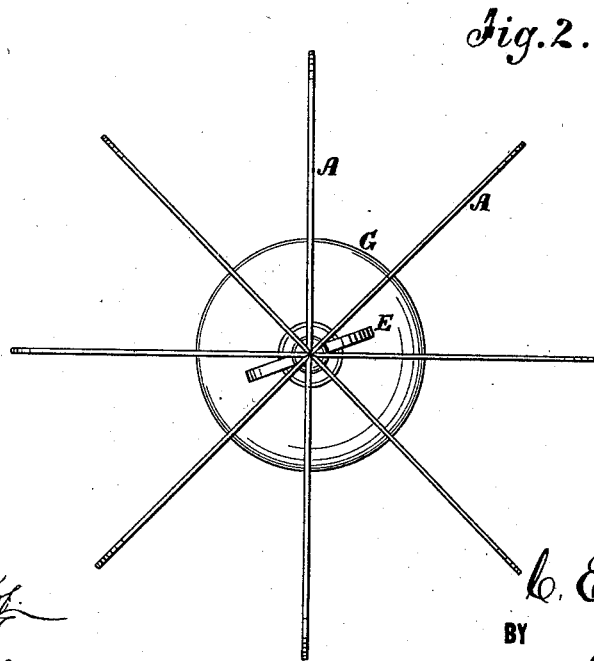

Figure 1 is a sectional elevation of my improved quartering and coring instrument, and Fig. 2 is a plan of the bottom.

Similar letters of reference indicate corresponding parts.

A represents the quartering-blades which radiate from a common center, B, which is a tube containing a rotating spindle, D, on which are bow-shaped coring-cutters E, arranged to swing in notches F of the quartering-blades. The spindle D has a handle, G, attached to the upper end, by which both the quartering and coring blades are manipulated.

The dotted line H, Fig. 1, indicates an apple being quartered and cored. The blades A are first pressed into the apple from the top far enough for the coring-cutters to come to the core. There they are allowed to rest until the spindle is turned a quarter of a revolution, or thereabout, the apple being prevented from turning with it by holding the quartering-blades; then the latter are driven entirely through to complete the work.

Having thus described my invention, I claim as new and desire to secure by Letters Patent—

The combination, with the notched radiating quartering-blades, of the coring-cutters E and the spindle D, substantially as specified.

CHARLES E. KIMBALL.

Witnesses:
T. B. MOSHER,
ALEX. F. ROBERTS.